United States Patent [19]

Bolt

[11] Patent Number: 5,732,356
[45] Date of Patent: Mar. 24, 1998

[54] METHOD AND AN ARRANGEMENT FOR SOUND RECONSTRUCTION DURING ERASURES

[75] Inventor: Jacob Hendrik Bolt, Hengelo, Netherlands

[73] Assignee: Telefonaktiebolaget LM Ericsson, Stockholm, Sweden

[21] Appl. No.: 555,724

[22] Filed: Nov. 9, 1995

[30] Foreign Application Priority Data

Nov. 10, 1994 [EP] European Pat. Off. ............. 94203275

[51] Int. Cl.$^6$ ............................ H04M 11/00; H04Q 7/00
[52] U.S. Cl. ...................... 455/462; 455/403; 455/422; 395/2.2; 395/2.37
[58] Field of Search ................ 370/435; 395/2.2, 395/2.37, 2.1, 2.35, 2.24, 2.23, 2.21, 2.87, 2.19, 2.3, 2.32; 379/61, 58, 59; 455/33.1; 369/36, 13, 14, 19, 44.33, 180, 272, 275.2; 360/11.1, 23, 32, 60, 67, 118; 375/354

[56] References Cited

U.S. PATENT DOCUMENTS

| | | | |
|---|---|---|---|
| 5,513,183 | 4/1996 | Kay et al. | 455/33.1 |
| 5,535,299 | 7/1996 | Riedel | 395/2.1 |
| 5,615,298 | 3/1997 | Chen | 395/2 |

FOREIGN PATENT DOCUMENTS

WO94/10769  5/1994  WIPO.

OTHER PUBLICATIONS

European Search Report, Date of completion of search: 30 Mar. 1995.
Varma et al., "Performance of 32kb/s ADPCM in Frame Erasures", Proceedings of the 44th IEEE Vehicular Technology Conference, vol. 2, pp. 1291–1295 (Jun. 8, 1994).

S. Kubota et al, "Improved ADPCM Voice Transmission Employing Click Noise Detection Scheme for TDMA–TDD Systems", The Fourth International Symposium on Personal, Indoor and Mobile Radio Communications (PIMRC'93), pp. 613, 613&617 (Sep. 8–11, 1993).

K. Enomoto et al., "A Very Low Power Consumption ADPCM Voice Codec LSIC for Personal Communication Systems", PIMRC'93, pp. 481, 483 & 485.

*Primary Examiner*—Dwayne Bost
*Assistant Examiner*—Keith Ferguson
*Attorney, Agent, or Firm*—Burns, Doane, Swecker & Mathis, L.L.P.

[57] ABSTRACT

Digital audio or sound information such a speech is typically transmitted in bursts or packets containing a plurality of digitized sound samples. For the reconstruction of such a digital data stream in the presence of erasures or mutes, a method and an arrangement is disclosed, in which at a data receiver having an audio processing portion a plurality of successively data bursts outputted from a speech buffer are stored into a cyclic buffer. During an erasure, the data stream is reconstructed by outputting into the speech buffer stored bursts in their reversed order of storage. By reusing the bursts while reversing the sequence of the digitized sound samples, a virtually click free reconstruction of the data stream is obtained. An embodiment for use with a cordless telephone system is described.

15 Claims, 3 Drawing Sheets

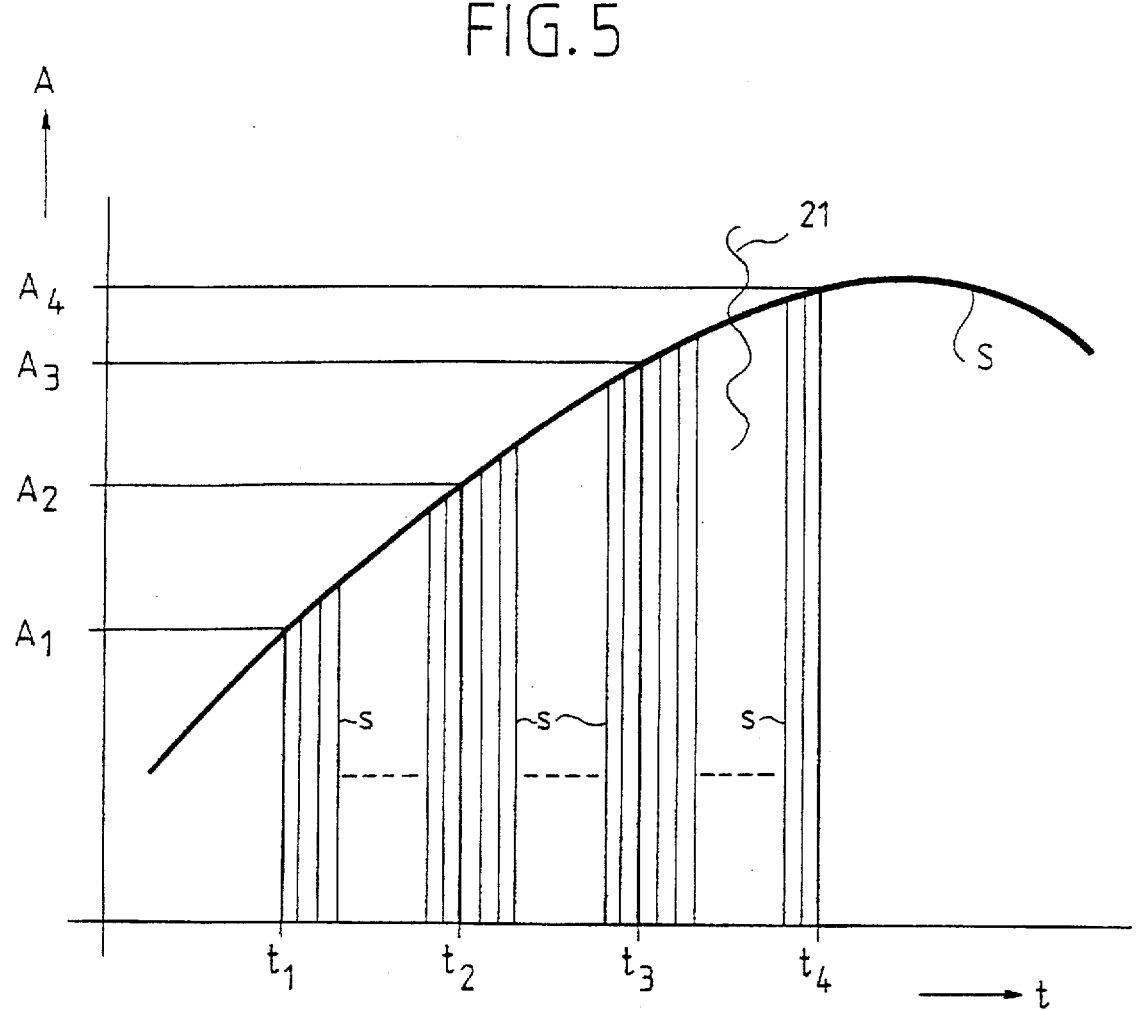

METHOD AND AN ARRANGEMENT FOR SOUND RECONSTRUCTION DURING ERASURES

FIELD OF THE INVENTION

The present invention relates generally to the reconstruction of a digital audio or sound data stream and, more specifically to the reconstruction of a digitized voice or speech data stream in a digital communication system, in particular a radio communication system subjected to erasures of the data stream.

BACKGROUND OF THE INVENTION

Audio or sound data streams in digital communication systems or recording and reproducing arrangements generally comprise a plurality of digitized sound samples. The digital data are usually obtained by approximating the magnitude of the analog sound sample to a nearest reference level. A technique which is called quantization. In a process called Pulse Code Modulation (PCM) a digital code word comprising a number of data bits representing the reference level is generated as a digital representation of the analog sound sample.

For transmission or recording purposes, this digital representation can be subjected to a further coding algorithm, such as Adaptive Differential Pulse Code Modulation (ADPCM), for example. ADPCM is a coding technique in which the difference between two consecutive PCM input values is quantized and encoded as ADPCM data words. The quantization process is dynamically adapted to the momentary average signal level. An ADPCM algorithm widely used in personal or cordless radio telecommunication systems is described in CCITT Recommendation G.726 (former G.721).

Arrangements of encoders for coding the sound samples and decoders for reconstructing the coded sound information are known in the art as codecs.

In the presence of disturbances in a digital speech channel, for example, such that the bit error rate becomes excessively high, the listener can be subjected to unacceptable high level noise because the digitized speech can not be reconstructed from the disturbed input data stream. In digital multiple access telecommunication systems, the data streams are generally transmitted in bursts comprising a number of digitized speech samples. Skipping of erroneously received bursts results in erasures of the data stream. These burst errors do not only cause interruptions in the reconstructed speech signal but also induce click noise at the receiver.

To solve this problem a number of speech reconstruction techniques have been proposed and implemented, which are also known as muting algorithms or muting circuits.

An overview of prior art speech reconstruction techniques for use with ADPCM coding in transmission systems having data streams consisting of data bursts comprising a number of sound samples can be found in a paper by V. Varma et al., "Performance of 32 kb/s ADPCM in Frame Erasures", p. 1291–1295, published by the IEEE, 0-7803-1927-3/94.

A very simple mute technique is silence substitution. When a burst erasure is detected, all the sound bits of that burst are replaced by the lowest quantization level, which is equivalent to silence substitution. Another technique is simultaneous reset of the decoder and encoder at either end of the communication channel. This requires, however, that erasures are known to both the transmitter and the receiver of a communication system or a sound reproducing arrangement. Fixed frame repeat is a technique in which, when a burst erasure is detected, the last correct received burst is repeated. After a certain number of repetitions, dependent on the duration of the erasure and the nature of the sound, the input is scaled down to the lowest quantization level, i.e. equivalent to silence.

International Patent Application WO 94/10769 discloses a muting technique for use in radio communication systems operating in accordance with the Digital European Cordless Telecommunications (DECT) standard. In this system, the digitized speech data is transmitted in bursts, each burst contains a number of sound samples, encoded in accordance with the above mentioned CCITT G.726 ADPCM algorithm. In case of muting, a sequence of fixed ADPCM data words is fed to the ADPCM decoding circuit. Due to the absence of any difference between the successive code words, the signal strength at the output of the decoder levels down to the idle level.

It has been observed that silence substitution gets annoying when it frequently takes place, which can be the case in heavily faded transmission channels, for example.

Amongst the above prior art muting schemes, in case of muting, only the fixed frame or fixed burst repeat technique presents to the listener a signal which resembles the momentary sound. Although it has been observed that sound is preferred above silence, listening tests have shown that by repeating the same burst several times, a considerable amount of higher frequency tones, whistling sound and other noise are induced, such that this technique receives no preference above silence substitution.

SUMMARY OF THE INVENTION

In view of the foregoing background, it is therefore an object of the present invention to provide an improved method of and an arrangement for sound reproduction in case of erasure of a digital audio or sound data stream.

It is in particular an object of the present invention to provide an improved muting algorithm and circuit for use in a radio communication system, more specifically a radio telephone system using ADPCM as its speech coding technique.

It is also an object of the invention to provide a base station and a remote unit, such as a wireless portable telephone, for use in a radio communication system comprising the improved muting algorithm and arrangement according to the present invention.

These and other objects, advantages and features of the present invention are provided by a method of reconstruction of a digital sound data stream in the presence of erasures, using at least one data receiver arranged for the conversion of received digital sound data into an analog output signal. The data stream comprises a plurality of time successive data bursts and each data burst comprises a number of time successive digitized sound samples. According to the invention a plurality of successively outputted data bursts are stored at the receiver, such that during an erasure in the data stream, data bursts stored prior to this erasure are outputted in their reversed order of succession at the receiver.

For digitized speech, for example, it has been observed that a replay of data bursts in a reversed sequence over a period less than the periodicity or time constant of voiced speech, i.e. 40 to 50 msec, is not perceived as an unusual or extraordinary change in the reception of the speech. With the method according to the invention, contrary to a continuous repetition of the same burst, no or considerable less adverse effects in the form of high whistling sound or the like have been observed. This improvement is believed to be caused by the changing energy and frequency content of the information between the repeated bursts according to the invention.

Contrary to silence muting, with the present invention erasures in the sound data stream are masked to the listener, thus providing a subjective improvement of the overall communication quality over distorted communication channels. In the present context, the term erasure is used for those cases in which, for whatever reason, part of the received data stream cannot be processed.

In radio speech communication systems, such as cordless or mobile multiple access radio telephone systems for example, it has been observed that under normal operating conditions most of the erasures due to fading and other distortions in the transmission path or communication channel have a duration shorter than the periodicity of voiced speech.

Accordingly, in a further embodiment of the invention, for use with digitized speech, during an erasure of the data stream a number of data bursts equal to the number of erased bursts and up to a maximum number of bursts is repeated. The maximum number of bursts is set such that the maximum duration of the period of repetition is less or substantially equals the periodicity or time constant of voiced speech. After the replay of the maximum number of bursts the receiver is, however, switched to silence for the remainder of this erasure.

With the above further embodiment of the invention, for the majority of erasures a subjective improvement of the communication can be achieved without actually having to apply silence muting.

To suppress click noise after an erasure having a duration shorter than the periodicity of voiced speech, i.e. a replay or reuse of a number of stored bursts less than the set maximum number, in a still further embodiment of the invention the receiver is switched to silence for the duration of a number of samples at the start of the first burst of the recovered data stream.

The improved muting method of the invention is in particular found pertinent to sound processed with an adaptive coding algorithm such as the above-mentioned ADPCM coding. By repeating the data bursts in a reversed sequence their mutual relationship is maintained, such that sudden changes in the average signal level causing high click noise in the output level of the decoder are prevented. With such ADPCM coding, silence at the output of the receiver can be achieved by a repetition of ADPCM data words representing speech samples of idle level.

To avoid considerable variations in the average signal levels between the actual sound data and the reconstructed data stream, in particular for digitized speech, in an embodiment of the method according invention, the reconstruction or replay of data bursts is preferably started from the last or the last but one outputted, i.e. correct received, data burst immediately prior to the occurrence of an erasure.

A further improvement in the reduction of click noise can be achieved, according to another embodiment of the invention, by also outputting in a time reversed order the various sound samples of the repeated bursts. In particular when the last correct received speech sample is the first sample of the repeated sequence, a very smooth transition from the normal operation condition to the mute state is obtained.

It has been found that even a time reversed replay of the separate sound samples in a burst are perceived as resembling valid speech. Due to the smooth transitions of the successively reversed repeated sound samples of the various stored bursts, virtually no click noise at the transition from normal operation to muting has been observed.

In order to save battery power in telephone handsets for cordless or mobile radio communication systems, for example, in a yet further embodiment of the invention the storage of data bursts is effected dependent on the rate of erasures. This embodiment is based on the observations that silence muting for a few erasures during a telephone call is acceptable and less annoying compared to silence muting in heavily faded or otherwise distorted radio environments. Accordingly, by keeping a history of the outputted data bursts on a facultative basis such that battery power for data storage is only used for a subjective improvement of the communication when necessary, scarce and expensive battery power can be effectively used.

The method according to the invention is in particular suitable for use in communication systems operating in accordance with the Digital European Cordless Telecommunications (DECT) standard, wherein the erasure of a burst can be detected on the basis of either one or a combination of the following criteria: insufficient RF signal level (RSSI), burst synchronisation (SYNC) error, system information field test word (ACRC) error and/or data field test word (XCRC) error.

The invention relates also to an audio or sound conversion system, comprising at least one data receiver for the conversion of a received digital sound data stream into an analog output sound signal, and a digital arrangement for the reconstruction at the receiver of this digital sound data stream. The data stream comprising a plurality of time successive data bursts and each data burst comprising a number of time successive digitized sound samples. According to the invention, the arrangement is provided with storage means for storing a plurality of data bursts outputted at the receiver, and retrieving means operatively connected to these storage means, arranged such that during an erasure in the data stream data bursts stored prior to such erasure are retrieved and outputted in their reversed order of succession at the receiver.

In a preferred embodiment, the storage means comprise a cyclic buffer. Such a buffer and the retrieving means can be advantageously implemented under the control of digital processor means. To reduce click noise as much as possible, in a further embodiment of the arrangement according to the invention, the retrieving means are implemented such to retrieve the sound samples of a burst in time reversed order.

The invention relates also to a remote unit and a base station in a cordless radio communication system, in particular a wireless radio communication system operating in accordance with the DECT standard, comprising at least one base station and at least one remote unit, each provided with the above digital arrangement for the reconstruction of erasures in a received sound data stream.

The above-mentioned and other features and advantageous of the present invention are illustrated in the following description with reference to the enclosed drawings.

BRIEF DESCRIPTION OF THE DRAWINGS

FIG. 5 shows a time vs amplitude diagram illustrating a reduction of click noise.

DETAILED DESCRIPTION OF THE EMBODIMENTS

Without the intention of a limitation, the invention will now be explained by its application in a multiple access radio telephone system operating according to the DECT (Digital European Cordless Telecommunications) standard.

DECT is the mandatory European standard for all digital cordless telecommunication systems, i.e. for use in business environments such as offices and in residential areas for providing a type of Personal Communication Service (PCS) as well as making over radio the final link or local loop between the subscribers and the local telephone network, also called Radio in the Local Loop (RLL). Reference is made to International Patent Application WO 94/19877.

Figure 1:
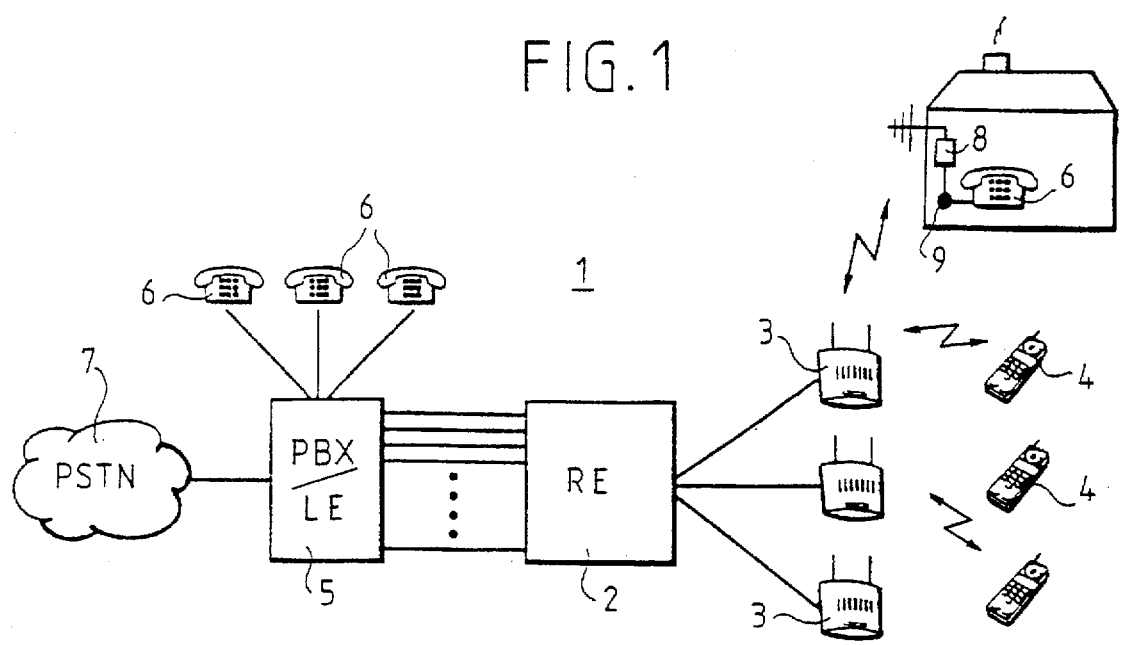
FIG. 1 shows, in a schematic and illustrative manner, a cordless telecommunication system in which the present invention can be used.

FIG. 1 illustrates a typical DECT system, generally designated with reference numeral 1. The system comprises three essential elements: a radio exchange (RE) 2, a plurality of compact radio base stations 3, which are installed throughout the area to be covered and connect directly to the radio exchange 2, and cordless or wireless portable telephones or handsets 4 which connect over a radio link to the base stations 3. Each base station 3 provides service to a given area, called a cell, which is surrounded and/or overlapped by other cells of other base stations 3, i.e. a so-called multi-cell approach. The radius of indoor cells amount typically from 10 m–100 m, whereas the radius of outdoor cells typically range from 200 m–400 m.

Generally, each base station 3 and portable 4 comprise an air interface in the form of a transceiver unit, having a transmitter/modulator part and a receiver/demodulator part, both connected to at least one receive/transmit antenna. Further, transmission control and synchronization units are provided for establishing correct radio link transmissions. Received and transmitted speech information is processed under the control of a speech processing unit, to which one or several codecs are connected. In the portable 4 these codecs connect to a microphone and loudspeaker part at the user interface of the portable. Each base station 3 and portable 4 are provided with central processing means for controlling the overall operation of the base station or portable.

The radio exchange 2 is connected to a wired exchange 5 to which a plurality of wired telephones 6 can be connected. In business environments, this exchange 5 is generally a so-called Private Branch Exchange (PBX) whereas in outdoor applications such as RLL, the exchange 5 is generally a Local Exchange (LE) which, like the PBX, is connected to a Public Switched Telephone Network (PSTN) 7, i.e. the ordinary wired public telephone network.

In RLL applications, the base stations 3 may also communicate with so-called (Wireless) Fixed Access Units ((W)FAU) 8 which, like the portables 4, comprise an air interface, transmission and control units, central processing means and a speech processing unit. In fixed RLL, for example, the (W)FAU 8 connects to a fixed telephone terminal or socket 9, for the connection of an ordinary wired telephone 6.

DECT uses a Multi-Carrier (MC)/Time Division Multiple Access (TDMA)/Time Division Duplex (TDD) format for radio communication between the remote units such as a cordless telephone 4 or (W)FAU 8 and the base-stations 3. With DECT, ten radio carriers are available. Each carrier is divided in the time domain into twenty-four 'time-slots'. Two time-slots are used to create a duplex speech channel, effectively resulting in twelve available speech channels at any of the ten radio carriers. The twenty-four time slots are transmitted in so-called TDMA frames having a frame cycle time $T_F$ of 10 ms.

Figure 2:
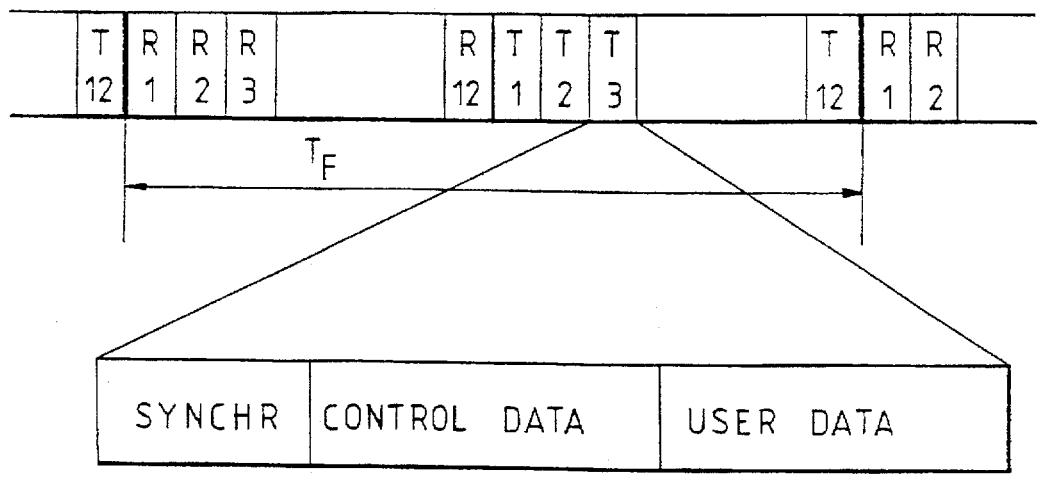
FIG. 2 shows, in a schematic and illustrative manner, a digital data stream comprising data bursts.

A typical frame structure is shown in FIG. 2. During the first halve of the frame, i.e. the first twelve time-slots designated R1, R2, ... R12, data from the base stations 3 are received by the portables 4 or (W)FAU 8, whereas in the second halve of each frame, i.e. the second twelve time-slots designated T1, T2, ... T12, the remote units 4 or 8 transmit data to the base stations 3. A radio connection between a base station and a remote unit is assigned a slot in the first halve of the frame and a slot bearing the same number in the second halve of the frame. Each time-slot typically contains synchronization data, control data and information or user data.

Figure 3:
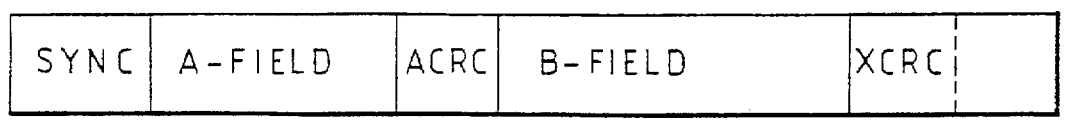
FIG. 3 shows in detail the structure of a data burst of FIG. 2.

A more detailed time-slot structure is shown in FIG. 3. The synchronization data field contains a so-called synchronization (SYNC) word, which must be correctly identified at the radio receiver in order to process the received data. The synchronization data serve also the purpose of data clock synchronization. SYNC data will typically need 32 bits.

The control data regularly contain system information on identity and access rights, services availability and, when required, information for handover to another channel in case of disturbances or another base station. Also paging and call set up procedures are carried over the control data field, which is also called A-FIELD. Control data will typically need 64 bits with a 16 bit Cyclic Redundancy Check word designated ACRC.

The information or user data, also called B-FIELD, comprise in case of a telephone call digitized speech samples obtained during the frame cycle time $T_F$ of 10 ms. These speech samples are coded in accordance with the above-mentioned ADPCM coding algorithm CCITT Rec. G.726 with a typical bit rate of 32 kb/s. This means that for each speech call 320 bits have to be transmitted and received during every frame. The ADPCM coded B-FIELD data contain 80 speech samples of 4 bit each. As disclosed before, these ADPCM data are formed from the difference of successive 8 bit wide PCM coded speech samples. The ADPCM quantization process is dynamically adapted to the momentary average signal level.

The B-FIELD data is scrambled and a 4 bit Cyclic Redundancy Check word designated XCRC is formed from the information data. Including guard space the total number of bits per frame according to the DECT standard amounts to 480.

At the radio path between the base-stations 3 and the portables 4 or the (W)FAU 8, several disturbances can occur which lead to erroneous reconstruction of the speech, resulting in noise, cracks, clicks etc. in the output signal at either end of the telephone link, or even a complete erasure of the data. The latter is the case when no frame synchronization can be established (SYNC-error) or in case of errors in the control data (A-FIELD). In such cases, which are also called mute or mutes, no data is available at the input (IN) of the receiver.

Simulations have shown that frequent mutes resulting in silence are very annoying to the listener. It is preferred to provide in case of erasures of the sound data stream as long as possible a continuous, non-interrupted output signal at the receiver end, and such that this output signal is perceived as meaningful speech, for example. For the duration of the periodicity of voiced speech, this can be achieved with the method according to the present invention, which will now be explained with reference to FIG. 4.

Figure 4:
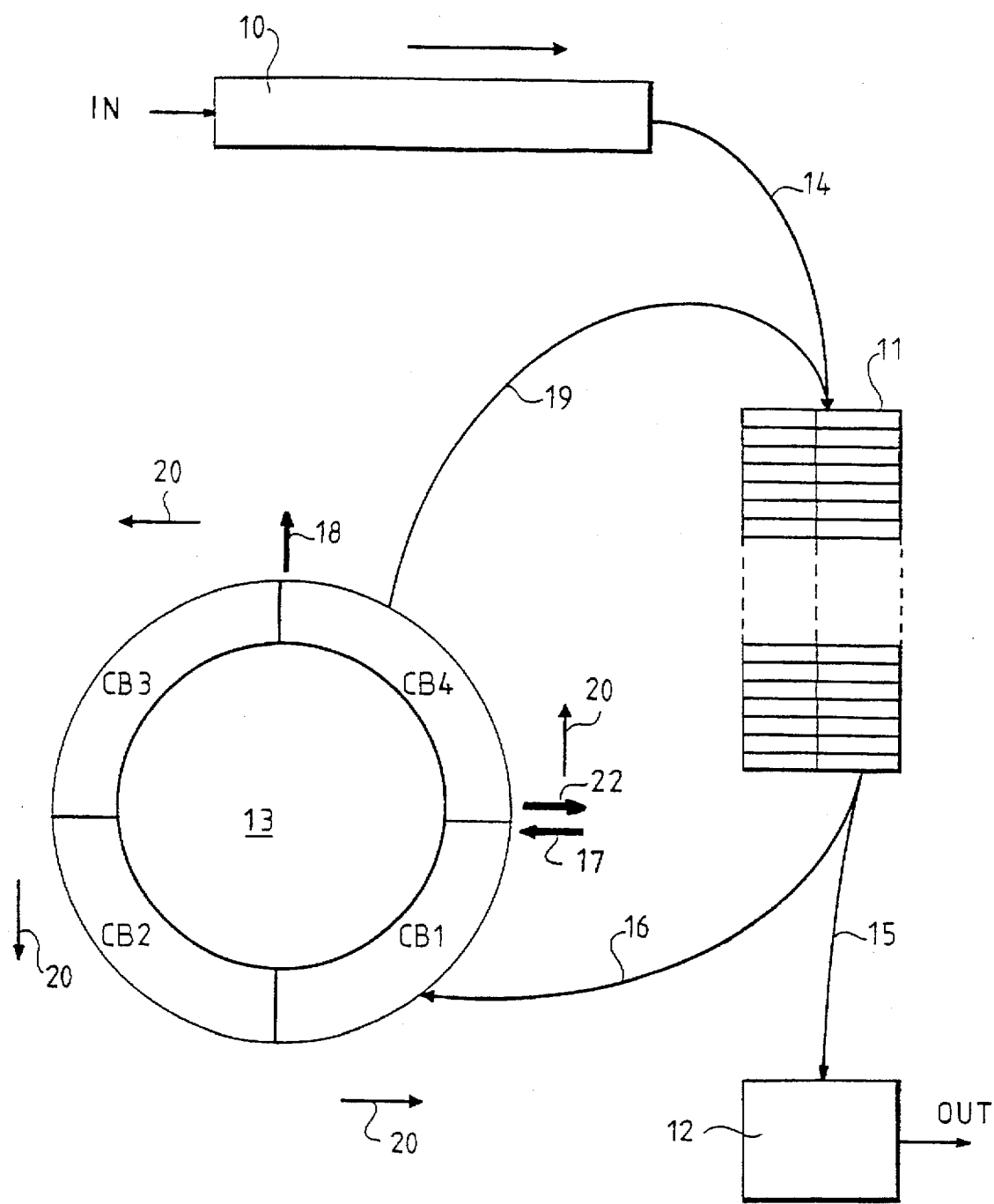
FIG. 4 shows a block diagram of an arrangement operating in accordance with the method of the invention.

FIG. 4 depicts a block diagram of a data receiver of both a base station 3 and a remote unit 4, 8 of a DECT communication system shown in FIG. 1. Since it is understood by those skilled in the art that several other components and devices are ordinarily included in such a system, as briefly discussed above with reference to FIG. 1, only those pertinent to the present invention will be shown and discussed.

In a speech processing portion 10 of the data receiver speech data contained in the B-FIELD of a time-slot of a received data stream at the input (IN) of the data receiver are obtained in serial form. As indicated above, the speech data or burst of one time-slot consists of eighty 4-bit ADPCM data words, also called nibbles. Under the control of central processing means, these nibbles are written via line 14 in pairs in a speech buffer 11 containing forty buffer positions, of two nibbles each, indicated by rectangular boxes. The speech buffer 11 is of a First In First Out (FIFO) type.

The content of the speech buffer 11 is read during the frame cycle time $T_F$ of 10 ms and is submitted via line 15 to an ADPCM G.726 codec 12, which converts the received nibbles first into PCM coded speech. This PCM coded speech is further subjected to D/A conversion to provide analog speech at the output (OUT) of the receiver. With the correct receipt of a successive TDMA frame and corresponding time-slot, the speech buffer 11 is refilled with a new speech burst, such that a continuous speech signal can be provided at the output (OUT) of the receiver.

Simultaneously with the reading of the speech buffer 11, its content is also stored via line 16 in a so-called cyclic buffer 13. In the embodiment shown, the cyclic buffer 13 contains four buffer fields, designated CB1, CB2, CB3 and CB4, and each having the size of the speech buffer 11. The cyclic buffer 13 can store up to 40 ms of speech, which is less than the periodicity of voiced speech.

During normal, undisturbed operation, the cyclic buffer 13 is continuously overwritten with successively received speech bursts, i.e. CB1, CB2, CB3, CB4, CB1, CB2, ... etc., controlled by a write pointer depicted in the form of an arrow 17. The operation of the cyclic buffer 13 can be visualized by a counter clockwise rotation of the buffer fields, indicated by arrows 20, compared to a stationary write pointer 17 as depicted.

In case of an erasure (mute) in the received data stream, no new data will be written into the speech buffer 11 by the speech processing portion 10. At the completion of the current speech buffer readout no new information will be stored in the cyclic buffer 13, i.e. the write pointer 17 is disabled. Instead, under control of the central processing means, a retrieving means in the form of a read pointer 18 is enabled.

The information last stored in the cyclic buffer 13 immediately prior to the erasure, assume buffer field CB4, is now via line 19 transferred back to the speech buffer 11 and outputted from the speech buffer 11 to the codec 12 and further to the analog receiver output (OUT). After completion of the speech buffer 11, and in case no new speech burst is received from the speech processing portion 10, the read pointer 18 proceeds to the filling of the speech buffer 11 with data stored in field CB3 of the cyclic buffer 13, such that the speech bursts successively stored in the cyclic buffer 13 are read in their reversed order of storage, cf. a Last In First Out (LIFO) operation.

In case of muting, up to a maximum of four data bursts, i.e. four speech buffer contents of eighty speech samples, can be reused to reconstruct the data stream. Because the mutual relationship between the reused bursts is maintained, although in a reversed order, no sudden changes in the average signal value to which the ADPCM codec adapts will occur, which sudden changes can give rise to high level noise, clicks, cracks and the like at either end of the communication link of the receiving process.

As already described in the introductory part to the present invention, the reversed replay of the speech bursts is not interpreted by the listener as noise or the like. Rather, it is perceived as a more or less seamless continuation of the ongoing conversation, provided that the replay lasts not longer than the periodicity of the speech. After this period, silence has to be substituted in order not to subject the listener to noise.

In the embodiment shown in FIG. 4, silence can be easily substituted by filling the cyclic buffer 13 with fixed nibbles equal to the lowest quantization level, for example. However, the codec 12 can also be reset. In some embodiments, codecs have a separate control terminal, through the activation of which silence substitution can be effected.

Different from the above description, in case of a mute, the read pointer 18 can also start from the last but one stored data burst. In such cases, for example, a cyclic buffer having five buffer fields can be applied and such that only four consecutive fields can be accessed by the read pointer 18.

It will be understood that the readout of the cyclic buffer 13 will be stopped, that is to say counted in terms of complete bursts, after the normal data flow from the speech processing portion 10 has been restored, i.e. read pointer 18 is disabled and write pointer 17 is enabled. Each time an erasure has occurred and has ended, the complete content of the cyclic buffer 13 is cleared. This to maintain consecutive bursts in the cyclic buffer 13.

In the foregoing description the bursts are replayed or reused while maintaining the time order of the respective digitized speech samples or nibbles of each burst. However, it has been found that with a reversed replay of the bursts while simultaneously also reversing the time order of the speech samples, an improvement in the reduction of click noise can be obtained. This is best illustrated with reference to FIG. 5.

FIG. 5 shows in a time t vs amplitude A diagram a sloping analog input signal S. The signal S is sampled from time $t_1$ to time $t_2$, from time $t_2$ to time $t_3$ etc. Each such period forms a burst of signal samples s which are quantized and encoded. Following the DECT standard, these time periods have a duration of 10 ms in which 80 samples are taken. From time $t_1$ to time $t_2$ the signal amplitude increases from level $A_1$ to level $A_2$. During the next period the signal amplitude increases from level $A_2$ to level $A_3$ etc.

Assume that the burst from $t_3$ to $t_4$ will not be received, indicated by a meander line 21. In such case, following an embodiment of the invention, the burst from $t_2$ to $t_3$ will be first repeated. However, with this repetition, the first repeated sample relates to the lower amplitude level $A_2$ instead of the last outputted higher level $A_3$. This level drop and the corresponding phase jump will induce audible click noise at the output of the receiver. By now repeating the various samples in time reversed order, such that the last outputted sample of the burst prior to the occurrence of a mute is first replayed, no such level drop will occur. This holds also for the previously stored bursts.

It has been observed that such time reversed replay of speech samples is neither perceived as noise nor as a sudden and unexpected change in the analog output signal of the receiver. This is believed to be caused by the fact that, despite the reversal of the time sequence of the speech samples, the overall frequency and energy content of the bursts are maintained, such that it is still perceived by the listener as meaningful speech.

Successively reversed replay of the bursts and successively reversed replay of the data words (samples) can be effected by filling the speech buffer 11 while using a stationary read pointer 22 positioned as depicted in FIG. 4. Which can be visualized as a clockwise "rotation" of the cyclic buffer 13, i.e. in a direction opposite to the arrows 20.

For those skilled in the art it will be appreciated that the implementation of such cyclic buffer and speech buffer can be carried out in numerous manners. The storage and retrieval of the data is preferably implemented using a programmable processor means. Further, the reused data bursts can also be submitted directly from the cyclic buffer to the codec 12, for example. The number of buffer fields CB depends of course on the number of reusable bursts, i.e. the periodicity of the sound divided by the time of one burst.

In a DECT system, the decision to mute can be made upon a check of the several test words ACRC, XCRC of an input data stream, the inability of synchronizing a frame, i.e. a SYNC error, and a too low RF signal strength, indicated by the so-called Radio Signal Strength Indicator (RSSI). Reference is made to International Patent Application WO 94/10769.

Whether to keep a history of the outputted information can be made dependent upon a predetermined threshold rate of erasures in the data stream. In case of a low mute rate, such that during a call of normal length just one or a few erasures occur, it is often acceptable to insert silence. By not keeping a history of the outputted speech, battery power in the portable can be saved. However in all other cases the method of the present invention provides a significant improvement, worthwhile the extra power consumption.

As described in the above paper by V. Varma et al., the G.726 (former G.721) ADPCM standard codec is robust in the presence of random bit errors up to a bit error rate (BER) of $10^{-3}$. However, in the presence of erasures or a fixed input the decoder output decays rapidly, resulting in silence at the receiver output. When correct transmission is restored the decoder recovers from a few ms to over 100 ms, mainly dependent on the length of the erasure.

Analysis of the effect of the known techniques show that each of them result in more or less the same recovery times of the G.726 (former G.721) ADPCM codec, for erasures having a duration above approximately 25 ms. With the method of the present invention, during mutes, the average signal level of the signal fed to the ADPCM decoder in the receiver is kept more or less at the same level. Accordingly, it may be expected that the decoder under the method of the invention will recover more rapidly compared to the above known muting strategies. This has the advantage that click noise induced with the restoration of a data stream will generally be modest when using the present invention.

To suppress this click noise even further, it is proposed to switch the receiver to silence for the duration of a few samples at the readout of the first recovered burst after an erasure lasting not longer than the content of the cyclic buffer. As already described above, in case of an ADPCM decoder, for example, silence can be induced by inputting a number of ADPCM data words representing idle level.

By adding a click noise processor circuit such as described in a paper by S. Kubota et al., "Improved ADPCM Voice Transmission Employing Click Noise Detection Scheme for TDMA-TDD Systems", The Fourth International Symposium on Personal, Indoor and Mobile Radio Communications (PIMRC '93), Yokohama, Japan, Sep. 8–11, 1993, p. C4.6.1–C4.6.5, the click noise induced in the loudspeaker of a receiver at the recovery of a data stream can be further suppressed.

Although the present invention has been described with reference to a DECT communication system, it will be understood that the novel muting algorithm and arrangement according to the present invention can be used more generally in digital sound reconstruction systems having packet sound or voice transmission/reception, and in particular with communication systems having digitized sound data, such as the digital cordless CT2 system and the digital mobile cellular systems.

I claim:

1. A method of reconstructing a digital sound data stream in the presence of erasures, using at least one data receiver arranged for the conversion of a received digital sound data stream into an analog output sound signal, said digital sound data stream comprising a plurality of time successive data bursts and each data burst comprising a number of time successive digitized sound samples, wherein a plurality of successively outputted data bursts are stored at the receiver, and in that during an erasure in said data stream, data bursts stored prior to said erasure are outputted in their reversed order of succession at the receiver.

2. A method according to claim 1, wherein said repetition of data bursts starts with the last outputted data burst.

3. A method according to claim 1, wherein said repetition of data bursts starts with the last but one outputted data burst.

4. A method according to claim 1, wherein the sound samples of repeated bursts are outputted in a time reversed order.

5. A method according to claim 1, wherein said data stream is digitized speech, and wherein a number of data bursts equal to the number of erased bursts and up to a maximum number of bursts is repeated, said maximum number is set such that the period of repetition is less or substantially equals the periodicity of voiced speech, and wherein after the repetition of said maximum number of bursts the receiver is switched to silence during the remainder of said erasure.

6. A method according to claim 5, wherein after an erasure and if a number of bursts less than said maximum number is repeated, the receiver is switched to silence for the duration of a number of samples.

7. A method according to claim 5, wherein said digitized speech is coded on the basis of an Adaptive Differential Pulse Code Modulation (ADPCM) technique, and wherein said silence is obtained by a repetition of ADPCM data words representing idle level.

8. A method according to claim 1, wherein said outputted data bursts are stored when the number of burst erasures exceeds a predetermined threshold rate.

9. A method according to claim 1, wherein said input data stream is transmitted in a multiple access radio communication system.

10. A method according to claim 9, wherein said radio communication system operates in accordance with the Digital European Cordless Telecommunications (DECT) standard, and wherein the erasure of a burst is detected on the basis of at least one of the following criteria: insufficient RF signal level (RSSI), burst synchronisation (SYNC) error, system information field test word (A CRC) error, data field test word (X CRC) error.

11. In a sound conversion system, comprising at least one data receiver for the conversion of a received digital sound data stream into an analog output sound signal, said sound data stream comprising a plurality of time successive data bursts and each data burst comprising a number of time successive digitized sound samples, a digital arrangement for the reconstruction at said receiver of said digital sound data stream, said arrangement comprising storage means for storing a plurality of data bursts outputted at said receiver, and retrieving means operatively connected to said storage means and arranged such that during an erasure in said data stream data bursts stored prior to said erasure are retrieved and outputted in their reversed order of succession at said receiver.

12. A digital arrangement according to claim 11, wherein said storage means comprise a cyclic buffer.

13. A digital arrangement according to claim 11, wherein said retrieving means are arranged to retrieve said sound samples of a burst in time reversed order.

14. A remote unit, such as a cordless telephone, for use in a radio communication system comprising at least one base station and at least one remote unit, in particular a cordless radio communication system, wherein said remote unit comprises at least one data receiver for the conversion of a received digital sound data stream into an analog output sound signal, said sound data stream comprising a plurality of time successive data bursts and each data burst comprising a number of time successive digitized sound samples, and a digital arrangement for the reconstruction at said receiver of said digital sound data stream, said arrangement comprising storage means for storing a plurality of data bursts outputted at said receiver, and retrieving means operatively connected to said storage means and arranged such that during an erasure in said data stream data bursts stored prior to said erasure are retrieved and outputted in their reversed order of succession at said receiver.

15. A base station for use in a radio communication system, comprising at least one base station and at least one remote unit, in particular a cordless radio communication system, wherein said base station comprises at least one data receiver for the conversion of a received digital sound data stream into an analog output sound signal, said sound data stream comprising a plurality of time successive data bursts and each data burst comprising a number of time successive digitized sound samples, and a digital arrangement for the reconstruction at said receiver of said digital sound data stream, said arrangement comprising storage means for storing a plurality of data bursts outputted at said receiver, and retrieving means operatively connected to said storage means and arranged such that during an erasure in said data stream data bursts stored prior to said erasure are retrieved and outputted in their reversed order of succession at said receiver.

* * * * *